United States Patent [19]
Hickey

[11] 4,055,355
[45] Oct. 25, 1977

[54] ROAD VEHICLES

[76] Inventor: Christopher Daniel Dowling Hickey, 5 Heathside, Hinchley Wood, Esher, Surrey, England

[21] Appl. No.: 669,989

[22] Filed: Mar. 24, 1976

[30] Foreign Application Priority Data

Mar. 27, 1975 United Kingdom ............... 13112/75

[51] Int. Cl.² .............................................. B60P 7/00
[52] U.S. Cl. ................................................. 280/179 A
[58] Field of Search ................... 280/179 R; 105/468, 105/467; 296/100; 248/362, 499, 500, 503, 363; 244/118 R

[56] References Cited

U.S. PATENT DOCUMENTS

| 2,907,580 | 10/1959 | Tietig | 280/179 R |
| 3,429,095 | 2/1969 | Huson | 206/386 X |

*Primary Examiner*—Robert R. Song
*Attorney, Agent, or Firm*—Young & Thompson

[57] ABSTRACT

A load-carrying vehicle has either an air-impermeable load platform or an air-impermeable sheet over the platform and has a further air-impermeable sheet put over the goods on the platform. Continuous extraction of air from within the sheet, despite possible leakage of air into the sheet around its periphery, causes a significant reduction in pressure so that the sheet holds the goods onto the platform.

10 Claims, 6 Drawing Figures

ROAD VEHICLES

BACKGROUND OF THE INVENTION

1. Field of the Invention

This invention relates to road vehicles, particularly to road vehicles having load-restraining mechanisms.

2. Prior Art

Vacuum restraint systems are known in which a sheet of flexible impermeable material is put over a load on an air-impermeable base and in which the periphery of the sheet is then sealed to the base by an airtight seal. The space within the sheet is then partially evacuated; the reduced pressure holds the sheet tightly down onto the load so holding the load firmly on the base. Such systems find particular application for loads which may have to be stored for long periods and may have to be transported. It is usual therefore to use a separate pallet as the base. It has been proposed that a vacuum restraint system should be used for holding a load on a vehicle but the work involved in making the airtight seal, e.g. by tucking the whole periphery of the sheet into a groove formed in the base and then inflating a tube, on the peripheral edge of the sheet, to hold the sheet tightly in the groove, is uneconomic if the goods are to be on the vehicle only for a short time.

SUMMARY OF THE INVENTION

It is an object of the present invention to provide a vacuum restraint system on a vehicle which can be used with no more effort than is involved in the roping of a waterproof sheet over the load yet which serves to hold even a complex-shaped load, possibly of many discrete articles, firmly in place.

According to the present invention there is provided a road vehicle including a vehicle body having a support surface for receiving a load, an air impermeable flexible oversheet for covering, in use, the load supported by the support surface to form with the support surface a restriction to air flowing into the space formed between the oversheet and the support surface and means for continuously applying suction to the space to collapse the oversheet around the load to restrain the load from movement with respect to the support surface.

With this construction, the continuous suction holds the oversheet down onto the load and onto the support surface. The suction tends to seal the gaps between the sheet and the support surface structure so restricting leakage of air into the region under the sheet. A pressure differential is thus obtained which, acting over the large area of the sheet, provides firm restraint of the load.

The vehicle may include means for securing at least one edge of the oversheet to the support surface.

An air impermeable undersheet may be secured to the support surface, the load being received, in use, on at least part of the undersheet. In this case the undersheet may have a first portion, which is secured to the support surface and which, in use, receives the load, and a second portion which, in use, can be wrapped around at least a part of the load. In this latter case, an aperture is provided in said undersheet connected to said suction means for continuously applying suction.

Means may be provided for releasably securing the oversheet to the undersheet.

At least one further oversheet may be provided each further sheet having means for securing one of its edges to the support surface. Means for releasably securing each of the further oversheets to at least one other sheet may be provided.

The means for continuously applying suction may include a pump connected to said space via an aperture in the support surface, or an aperture in a headboard of the vehicle, or an aperture in the undersheet, or an aperture in that oversheet which, in use, is in contact with the load.

The means for securing the oversheet to the support surface and the means for securing each of the further sheets to the support surface may comprise conventional fastening systems. For securing sheets together or for securing a sheet on to a flat surface, a fastener such as a "Velcro" fastener may be used.

Similarly any of the means for releasably securing may comprise conventional releasable fastening systems.

Each of the means for securing and means for releasably securing form, in use, a restriction to the air flow into said space.

DESCRIPTION OF THE PREFERRED EMBODIMENTS

Figure 1:
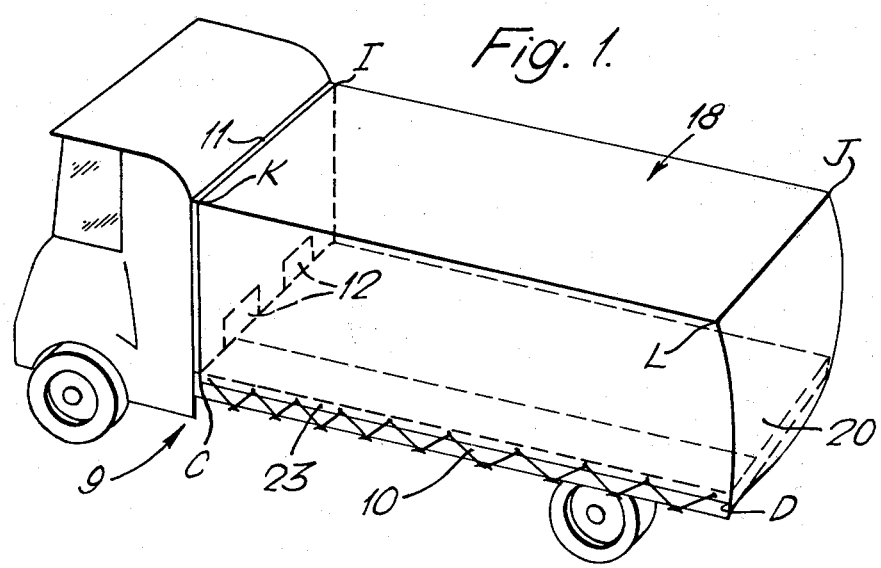
FIG. 1 is a schematic view of a road vehicle with an air impermeable sheet indicated in dotted lines.

FIG. 1 shows a vehicle 9 having a load platform 10 which is substantially air impermeable and a headboard 11. Apertures 12 in the headboard are connected by an air suction duct 13 to a pump 14 forming a source of suction. The pump is, in this embodiment, driven by an electric motor 15 powered from the vehicle's battery 16 with a control unit 17 which conveniently is located in the driver's cab.

Figure 2:
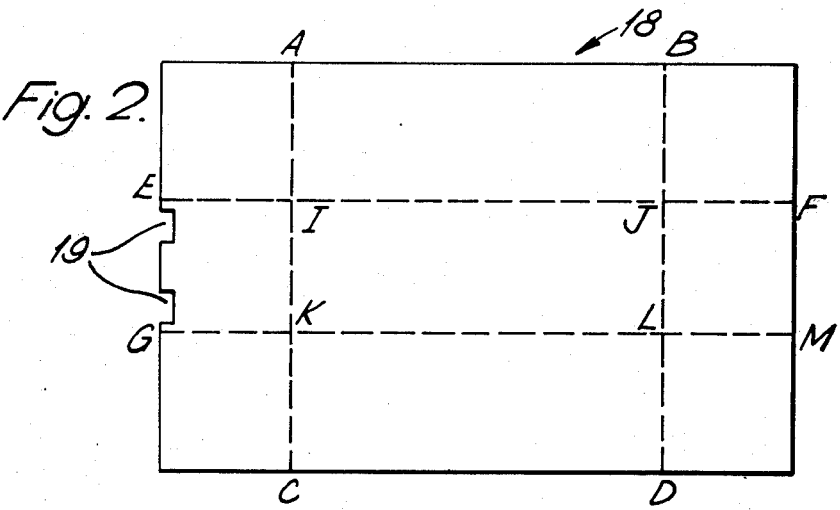
FIG. 2 is a plan view of the air impermeable sheet of FIG. 1 on a different scale.
Figure 5:
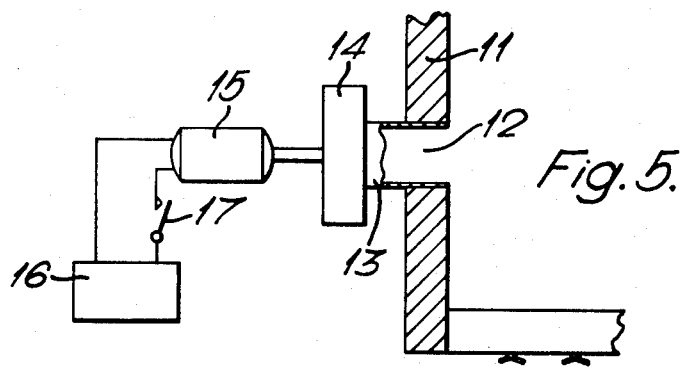
FIG. 5 is a diagram illustrating suction means used in the vehicle of FIGS. 1, 3 and 4.
Figure 6:
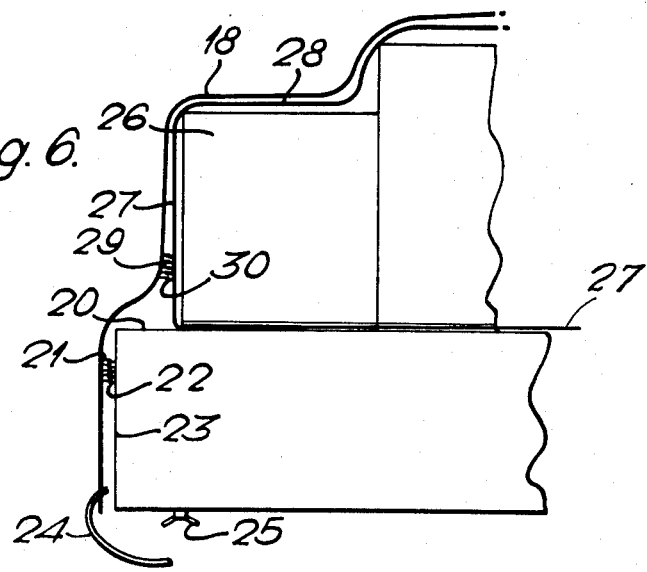
FIG. 6 is a scrap transverse sectional view of part of the assembly of FIG. 4.

FIG. 2 shows a plan view of an air impermeable sheet 18. Apertures 19 in the sheet at one end thereof correspond to apertures 12 in the headboard. In use rectangular portion EIGK of the sheet 18 is secured to the headboard 11 of the vehicle, with the apertures 12 and 19 aligned. The edges of the sheet may be secured to the upper surface 20 of the load platform 10 (as C to D in FIG. 1) or alternatively they may be secured to the underneath of the load platform 10 as shown in FIG. 6 and as is shown in FIG. 1 for the edge F to H of FIG. 2 which is secured underneath the tail part of platform 10. The edges of the sheet 18 may be secured by any conventional fastening means, e.g. they may be fixed by ropes passing through eyelets in the sheet and secured on cleats, or other fasteners such as "Velcro" fasteners may be used. Referring to FIG. 6, co-operating "Velcro" fastener strips 21, 22 on the sheet 18 and side 23 of the vehicle platform are shown as well as a part of a rope 24 for securing on a cleat such as cleat 25 on the underside of platform 10. The solid lines IK, IJ, JL and KL in FIG. 1 represent the top of the maximum volume contained by the sheet 18 of FIG. 2 when mounted on the vehicle 9.

Figure 3:
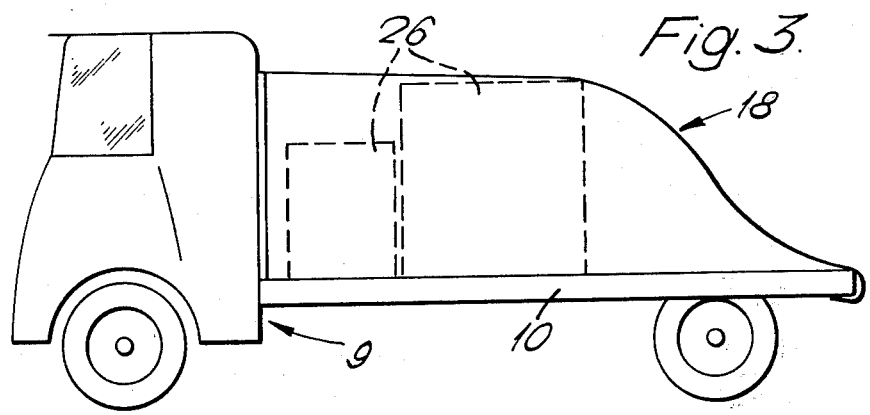
FIG. 3 is a schematic side view of the vehicle of FIG. 1 having a load and sheet mounted on it.
Figure 4:
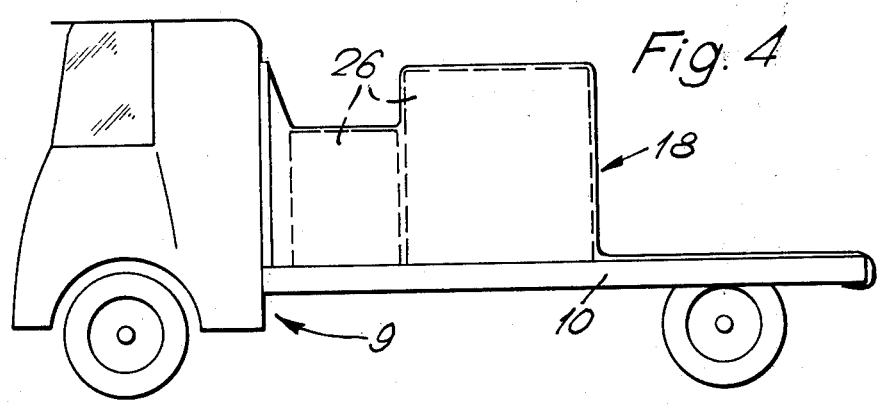
FIG. 4 is the vehicle of FIG. 3 when suction is applied.

When not in use that part of the sheet 18, which is not secured to the headboard 11, may be stored at the end of the load platform 10 nearest the headboard 11. In operation a load 26 (FIGS. 3, 4 and 6) is placed on the load platform 10 and is covered by the sheet 18 the edges of which are secured to the load platform (see FIG. 3). The motor-driven pump 14 is then switched on and air is evacuated through apertures 12 and 19 from the space within the sheet 18, creating a partial vacuum in this space, which causes the sheet 18 to collapse around the load, as shown in FIG. 4, and hence restrain the load from movement with respect to the load platform 10.

The pump is then run continuously until the vehicle completes its journey. When the pump is switched off the sheet 18 ceases to retain the load 26, which can then be uncovered and unloaded. As the pump is run continuously, the fastening means does not need to form a seal between the sheet 18 and the load platform 10, but merely needs to sufficiently restrict the flow of air for the initial partial vacuum to be formed. The suction tends to pull the sheet 18 close against the load and vehicle structure, thereby helping to restrict the inward leakage of air. Even a small pressure difference on the two sides of sheet 18 creates a substantial force over the load tending to secure the load firmly on the vehicle.

If the load platform 10 is not air impermeable it may be covered by an air impermeable undersheet 27 (FIG. 6). This undersheet preferably has a greater area than the load platform 10, so that it can be wrapped around at least a part of the load 26 as shown at 28. In this case the undersheet 27 has apertures aligned with the aforementioned apertures 12, 19. When the sheet 18 is placed over the load 26 it will be pulled against the undersheet 27 by the suction, and hence provide a further partial seal. Both the undersheet 27 and the oversheet 18 may be provided with "Velcro" strips or other releasable fastening means (as shown for example at 29, 30 in FIG. 6) so that they can be fastened together before the pump motor 15 is switched on.

The sheet 18 may be replaced by a set of sheets an edge of each of which is securable along a respective edge of the load platform 10. When the load is placed on the load platform 10, the sheets are each thrown over the load and secured to their respective opposite side, wrapping the load in a criss-cross of sheets. Each sheet may be provided with strips of "Velcro" fastener for fastening it to the other sheets. This use of a number of separate oversheets is particularly suitable for irregularly shaped loads. In arrangements employing a number of sheets, the overlap of the sheets form restrictions to the flow of air into the space around the goods; the suction draws the sheets into close contact.

I claim:

1. A road vehicle including a vehicle body having an air-impermeable support surface for receiving a load, an air-impermeable rigid upright headboard at one end of said support surface, said headboard having an aperture therein, an air-impermeable flexible oversheet for covering, in use, the load supported by the support surface to form with the support surface a restriction to air flowing into the space formed between the oversheet and the support surface, said oversheet being secured to said headboard, and means for continuously applying suction to said aperture to partially evacuate said space and thereby to collapse the oversheet around the load to restrain the load from movement with respect to the support surface.

2. A road vehicle as claimed in claim 1 and including means for securing at least one edge of the oversheet to the support surface.

3. A road vehicle for carrying a load including a vehicle body having a support surface, an air-impermeable undersheet secured to the support surface, the load being received on at least part of said undersheet, an air-impermeable flexible oversheet for covering the load and arranged to form, with the support surface and undersheet, a restriction to air flowing into the space between the undersheet and the oversheet, and means for continuously applying suction to said space to collapse the oversheet around the load thereby to restrain the load from movement with respect to the support surface.

4. A road vehicle as claimed in claim 3 wherein said undersheet has a first portion, which is secured to the support surface and which, in use, receives the load, and a second portion which, in use, can be wrapped around at least a part of the load and wherein an aperture is provided in said undersheet connected to said suction means for continuously applying suction.

5. A road vehicle as claimed in claim 3 with means for releasably securing the oversheet to the undersheet.

6. A road vehicle as claimed in claim 5 wherein at least one further oversheet is provided, each further sheet having means for securing one of its edges to the support surface.

7. A road vehicle as claimed in claim 6 wherein means are provided for releasably securing each of the further oversheets to at least one other oversheet.

8. A road vehicle including a vehicle body having a support surface with an air-impermeable sheet over said support surface to form a goods platform, a second air-impermeable sheet for putting over said goods, means for securing said second sheet around its periphery to said support surface, and air suction means connected to the region between the sheets for continuously applying suction to extract air from said region.

9. A road vehicle as claimed in claim 8 wherein the means for continuously applying suction include a pump connected to said region via an aperture in the support surface.

10. A road vehicle as claimed in claim 8 and having a headboard at one end of said platform wherein the means for continuously applying suction include a pump connected to said region via an aperture in said headboard.

* * * * *